(12) United States Patent
Khan et al.

(10) Patent No.: US 7,321,957 B2
(45) Date of Patent: Jan. 22, 2008

(54) DEBUGGING A TRUSTED COMPONENT IN A SYSTEM

(75) Inventors: Moinul H. Khan, Austin, TX (US); Mark N. Fullerton, Austin, TX (US); Anitha Kona, Austin, TX (US); Jeffrey S. Boyer, Dripping Springs, TX (US)

(73) Assignee: Intel Corporation, Santa Clara, CA (US)

( * ) Notice: Subject to any disclaimer, the term of this patent is extended or adjusted under 35 U.S.C. 154(b) by 628 days.

(21) Appl. No.: 10/693,344

(22) Filed: Oct. 24, 2003

(65) Prior Publication Data

US 2005/0091520 A1    Apr. 28, 2005

(51) Int. Cl.
*G06F 12/00*    (2006.01)

(52) U.S. Cl. ............ 711/152; 717/124; 713/193; 711/150

(58) Field of Classification Search .......... 717/124, 717/125; 713/189–194; 711/150–154
See application file for complete search history.

(56) References Cited

U.S. PATENT DOCUMENTS

| | | | |
|---|---|---|---|
| 4,937,864 A | | 6/1990 | Caseiras et al. |
| 6,000,033 A | * | 12/1999 | Kelley et al. .................. 726/8 |
| 6,532,553 B1 | * | 3/2003 | Gwilt et al. ................... 714/38 |
| 6,684,343 B1 | * | 1/2004 | Bouchier et al. ............... 714/4 |
| 2001/0016916 A1 | | 8/2001 | Mayer |
| 2003/0014643 A1 | * | 1/2003 | Asami et al. ................ 713/182 |
| 2003/0177373 A1 | * | 9/2003 | Moyer et al. ................ 713/189 |

FOREIGN PATENT DOCUMENTS

| | | |
|---|---|---|
| EP | 0 062438 | 10/1982 |
| WO | WO 02/48887 | 6/2002 |

OTHER PUBLICATIONS

PCT/US2004/034600 Internation Search Report and Written Opinion Mailed Feb. 20, 2006.

* cited by examiner

*Primary Examiner*—Meng-Al T. An
*Assistant Examiner*—Michael Yaary
(74) *Attorney, Agent, or Firm*—John F. Travis

(57) ABSTRACT

During debug operations in one embodiment of a trusted subsystem, passwords may be used to enable and disable access to selected areas, and to make access by different entities mutually exclusive. In another embodiment, programmable units may be used to define what the selected areas of access are for debug operations.

18 Claims, 7 Drawing Sheets

DEBUGGING A TRUSTED COMPONENT IN A SYSTEM

BACKGROUND

With more and more products being produced by a series of different manufactures or value-added resellers, maintaining security during manufacture is becoming an increasingly important issue. This may be especially problematic when processor code is being installed by multiple manufacturers. For example, one manufacturer may produce a processor chip containing code for operating a basic cell phone, and then pass it to another manufacturer to install code that is specific to a particular type of communications technology, and then pass it to a third manufacturer to install code for features that are specific to a particular brand and model of cell phone. A particular manufacturer may wish to prevent the other manufacturers from modifying (deliberately or inadvertently), or even viewing, its proprietary code, and may further wish to prevent the other manufacturers from creating code that causes interoperability problems with its previously working code. In addition, the same debug interface may be used for accessing trusted and non-trusted areas.

Historically, security features have been focused on reducing the probability of tampering with the code of a finished product during operation of the finished product. However, that approach does little to enable the various manufacturers to maintain security with respect to one another, since a given manufacturer may have access to the code installed by the previous manufacturer. These issues may be especially problematic during code debug operations, when the debug interface allows the current manufacturer to have access to resources deep within the chip, including both areas that may be modified freely and areas that are to be protected from modification.

BRIEF DESCRIPTION OF THE DRAWINGS

The invention may be understood by referring to the following description and accompanying drawings that are used to illustrate embodiments of the invention. In the drawings.

DETAILED DESCRIPTION OF THE INVENTION

Figure 1:
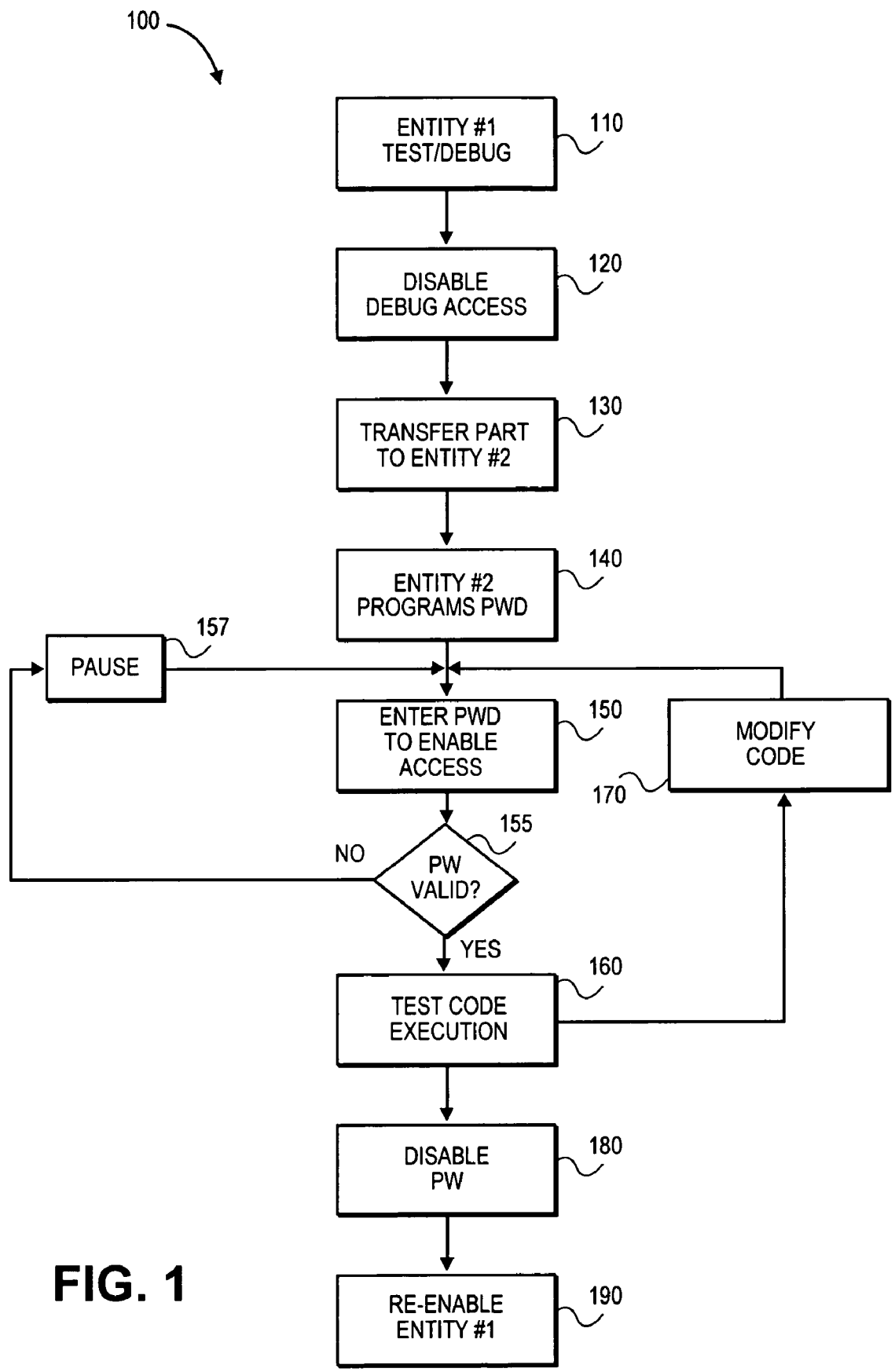
FIG. 1 shows a flow chart of a method of sequentially performing multiple debug processes by different entities, according to an embodiment of the invention.

In the following description, numerous specific details are set forth. However, it is understood that embodiments of the invention may be practiced without these specific details. In other instances, well-known circuits, structures and techniques may not be shown in detail in order not to obscure an understanding of this description.

Unless specifically stated otherwise, as apparent from the following discussions, it is appreciated that throughout the specification discussions utilizing terms such as "processing", "computing", "calculating", "determining", or the like, refer to the actions and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data. A "computing platform" may comprise one or more processors.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

Use of the adjectives "first", "second", "third", etc., to describe a common object, merely indicate that different instances of like objects are being referred to, and are not intended to imply that the objects so described must be in a given sequence, either temporally, spatially, in ranking, or in any other manner.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact directly with each other.

Embodiments of the invention may include apparatuses for performing the operations herein. An apparatus may be specially constructed for the desired purposes, or it may comprise a general purpose device that is selectively activated, configured, programmed, or otherwise adapted to perform the intended operations.

Some embodiments of the invention may use one or more passwords to permit debug operations to have exclusive access to selected resources within a subsystem, by allowing debug access within the subsystem by a particular entity at a particular stage of the development to be bounded and/or to be enabled and disabled. Access through various passwords may be mutually exclusive, so that only one entity at a time may have access to selected resources. In some embodiments the subsystem may be a trusted subsystem. A trusted subsystem may comprise a processor, code for execution by the processor, and various support circuitry, part or all of which is intended to be protected from unauthorized alteration and may be intended to be protected from unauthorized monitoring.

Other embodiments of the invention may use programmed indicators to determine if a debug operation performs unauthorized operations and/or accesses unauthorized areas when one or more instructions are executed during the debug operation.

FIG. 1 shows a flow chart of a method of sequentially performing multiple debug processes by different entities, according to an embodiment of the invention. Referring to flow chart 100, at 110 a first entity may perform a debug operation on the execution of code within a packaged part. In one embodiment, the packaged part may comprise a programmed integrated circuit and the first entity may be the party that actually fabricates the integrated circuit, but other embodiments may have different arrangements (e.g., the first entity may receive an unprogrammed integrated circuit from another entity and then install code in it). Although in some embodiments an 'entity' mentioned herein may be a company, other embodiments may have other arrangements (e.g., an entity may be, but is not limited to, a subset of a company, a combination of companies, a research organization, a person, a group of people, etc., that performs the indicated operations.)

In embodiments comprising code that is still under development, the debug process may test the code to determine if the code performs its internal operations successfully, and may also test the code to determine if it interacts properly with resources outside the boundaries of the trusted subsystem. In other embodiments containing code that has been previously-developed and debugged, only the interaction might need to be tested. In a related aspect, debug access to this code may be restricted while debug access to other code (e.g., code to be executed by a different processor) through the same debug access may be allowed.

The debug process may be used to determine the details of any problems in execution of the code, although the scope of the invention is not limited in this respect. In one embodiment, the debug process may execute individual instructions or groups of instructions, and then pause to examine a set of resources (e.g., registers, designated memory locations, counters, interrupt status, etc.) to determine if they are affected in the expected manner. If not, the code may be modified and the modified code subjected to the debug process again. This may be an iterative process that tests and retests multiple portions of code as many times as needed to produce correctly performing code. In one embodiment the debug process may be controlled by a system external to the packaged part that gains access to the key internal resources through a special test interface that is only used for debug purposes, although the scope of the invention is not limited in this respect.

When the debug process by the first entity is complete, at 120 access by the debug process may be disabled. In one embodiment this may be accomplished by preventing access through the test interface only to specific areas within the packaged part, while access to other areas through the test interface may still be permitted. In some embodiments the packaged part may comprise a trusted subsystem with initial code installed for testing and/or debug. In some embodiments, only debug access to the trusted subsystem is disabled at 120, while debug access to other areas within the packaged part may still be allowed.

At 130 the packaged part may be transferred to a second entity for further operations. In one embodiment the second entity may be a company, different than the first entity, that places additional code within the trusted subsystem and debugs that additional code. The first entity may wish to protect its previously-debugged code by preventing the second entity from having debug access to the full range of memory addresses and other resources that the first entity had, and may therefore allow the second entity to access only resources that are substantially or completely a subset of the resources that were previously accessible to the first entity, or to access a substantially different set of resources than were previously available to the first entity, although the invention is not limited in this respect. Such different levels of access may be accomplished by giving the second entity debug access through a separate mechanism than was used by the first entity. In some embodiments the second entity may gain debug access through a password not used by the first entity.

In a particular embodiment the second entity may determine its own password and program that password within the trusted subsystem at 140 to control future debug access to the trusted subsystem. In some embodiments the first entity may not disable its own password at 120, but rather the first entity's password may be disabled automatically when the second password is programmed at 140 by the second entity.

Although the scope of the invention is not limited in this respect, one embodiment of an iterative debug process is illustrated in FIG. 1 by the process loop 150, 160, 170, with an alternative loop for handling an incorrect password at 155, 157. When the code is to be tested, the previously-determined password may be entered at 150 to gain debug access to the trusted subsystem, thus permitting the code to be executed and the results monitored. If an invalid password is entered, as determined at 155, then the process may pause at 157 for a predetermined period of time before allowing another password to be entered. In one embodiment the password may be approximately 128 bits long, and the pause may be approximately 2 seconds long, which may make it relatively infeasible for someone to gain unauthorized access by merely trying all the possible password combinations. Other embodiments may have other values for one or both of those two parameters.

If the entered password is valid, then a portion of the code may be tested by executing it at 160, and the results examined to determine if the code executed as expected, although the scope of the invention is not limited in this respect. If execution of the code is determined to be unacceptable, the code may be modified at 170, and the test process run again. In one embodiment the password must be entered again after the code is modified to gain debug access, but other embodiments may use other techniques (e.g., once the password is entered, access may be continuously allowed until the password is intentionally disabled).

In some operations the second entity may program its own password and use that password exclusively to perform its own debug processes. In other operations the second entity may outsource the debug process by distributing the packaged part and the password to a third entity, who may use the password to perform debug. Multiple passwords may be used for multiple entities. In some embodiments, different passwords may permit access to different pre-defined ranges of resources, so that a given entity may access only the portion of the system it is supposed to work on.

After the debug process is complete and the code is considered acceptable, the password may be disabled at 180 to prevent further access through the debug interface by other entities that may subsequently handle the packaged part. In some operations, it may be desirable to return the part to the first entity for further debug, so at 190 access by the first entity may be re-enabled. In some embodiments, this may be accomplished by entering a re-enable password created specifically for this purpose.

Figure 2:
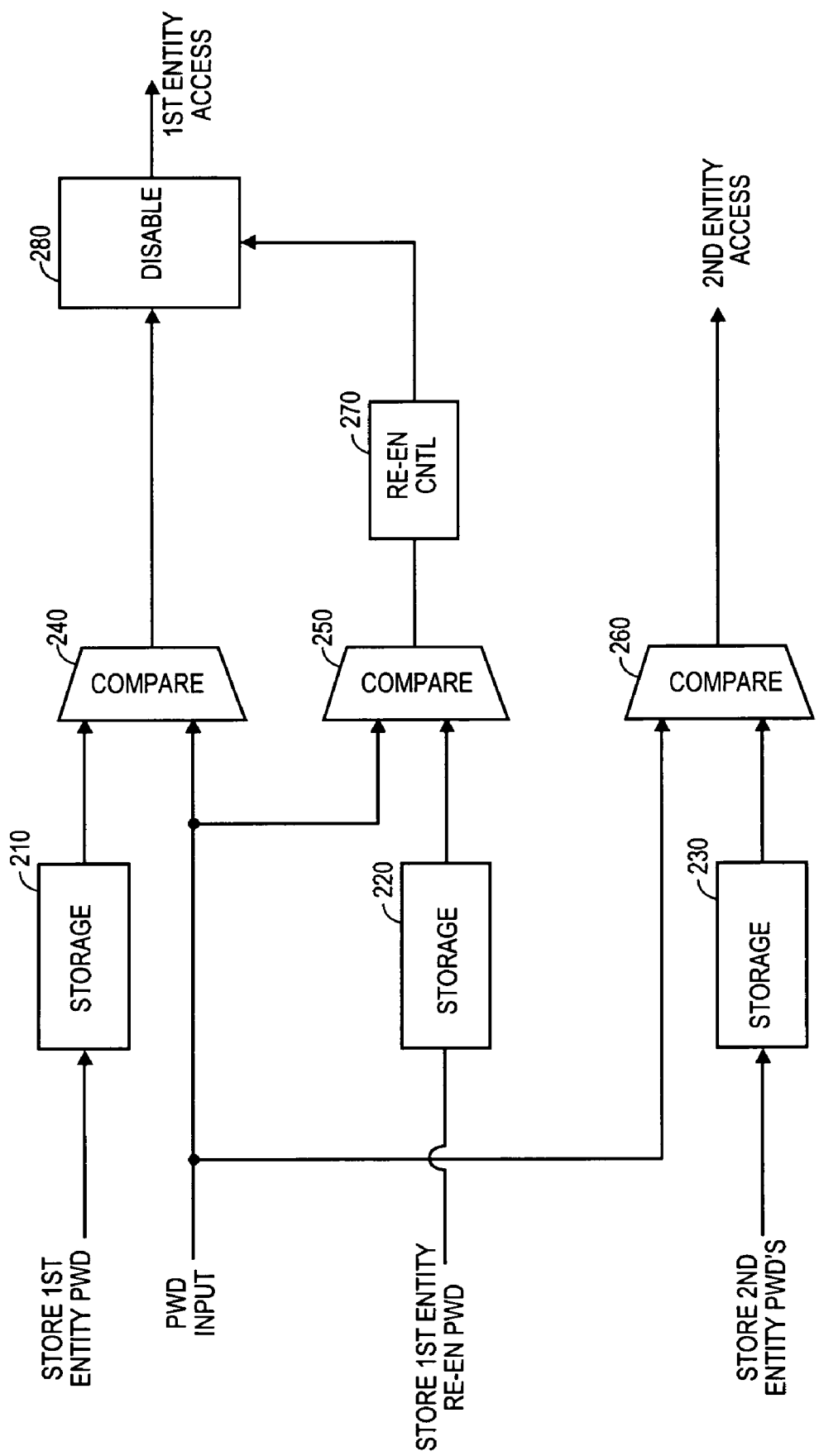
FIG. 2 shows a logic diagram of a circuit for implementing portions of the method illustrated in FIG. 1, according to an embodiment of the invention.

FIG. 2 shows a logic diagram of a circuit for implementing portions of the method illustrated in FIG. 1, according to an embodiment of the invention. The circuit of FIG. 2 may include storage structures 210, 220, and 230 for storing various passwords that, when presented to the circuit, may enable debug access in one or more selected areas as determined by comparators 240, 250, and 260. In a particular embodiment, the circuit of FIG. 2 may operate as described in the following paragraphs, although the scope of the invention is not limited in this respect.

To permit control of access by the first entity, a password may be stored in storage structure 210. In one embodiment, storage structure 210 is a programmable non-volatile storage structure such as flash memory, but other embodiments may use other techniques (e.g., the password may be created by blowing fuses, the password may be hardwired into the circuitry during manufacture, etc.) When the first entity originally performs debug operations, debug access may be enabled by presenting the password for the first entity at PWD INPUT. In one embodiment the password is a 128-bit binary number, but other formats may also be used. If the presented password matches the password stored in storage structure 210, the output of comparator 240 may be activated. Disable circuitry 280 may originally be set to allow the activated output of comparator 240 to be passed through as signal $1^{st}$ ENTITY ACCESS. In one embodiment, disable circuitry 280 may be a simple AND gate or OR gate, while re-enable control circuitry 270 may be a controllable non-volatile register, but other circuits may also be used. Activation of $1^{st}$ ENTITY ACCESS may trigger other circuitry (not shown) to enable the debug process, and may further define what resources such debug process is allowed to reach. When the debug process is completed by the first entity, the first entity may disable its own access by changing the state of re-enable control circuitry 270 so that the output of disable circuitry 280 is de-activated regardless of the output of comparator 240.

When the packaged part is received by the second entity, the second entity may create one or more passwords to permit debug access to selected areas, and store those passwords into storage structure 230. When a password is presented at PWD INPUT, if it matches a password stored in storage structure 230, comparator 260 may activate the signal 2nd ENTITY ACCESS. Activation of $2^{nd}$ ENTITY ACCESS may trigger other circuitry (not shown) to enable the debug process, and may further define what resources such debug process is allowed to reach. Different passwords may enable debug of, and/or restrict access to, different areas of the packaged part. In one embodiment the overall limitations on those selected areas may be built into the packaged part during manufacture or when the first entity has control of the packaged part, but in other embodiments the second entity may have control over the overall limitations. In one embodiment storage structure 230 is a content-addressable memory (CAM), but other types of circuitry may be used (e.g., a series of non-voltile registers, a single non-volatile register if only one password is to be stored, etc.). To allow for the possibility that the part will subsequently be returned to the first entity for further work, the second entity may also create a re-enable password that may be used to re-enable debug access for the first entity, and store the re-enable password in storage structure 220. In one embodiment the different passwords created by the second entity, including the re-enable password, may be created and stored at any time and need not all be created at the same time, but other embodiments may have other arrangements (e.g., all passwords created by the second entity must be created before any of those passwords is used for the first time, etc.).

In various embodiments the access granted by one of the one or more second entity passwords may be partially, substantially, or completely different than the access granted by the first entity password. For example, the resources, such as but not limited to memory, that are accessible by one of the second entity passwords may be a substantial subset, a substantial superset, or substantially different (such as a substantially different portion of memory) than the resources accessible by the first entity password. In some embodiments the differences in access may be in the form of different privilege levels. These examples represent various possible differences in access levels, but the invention is not limited to the examples given.

Figure 3:
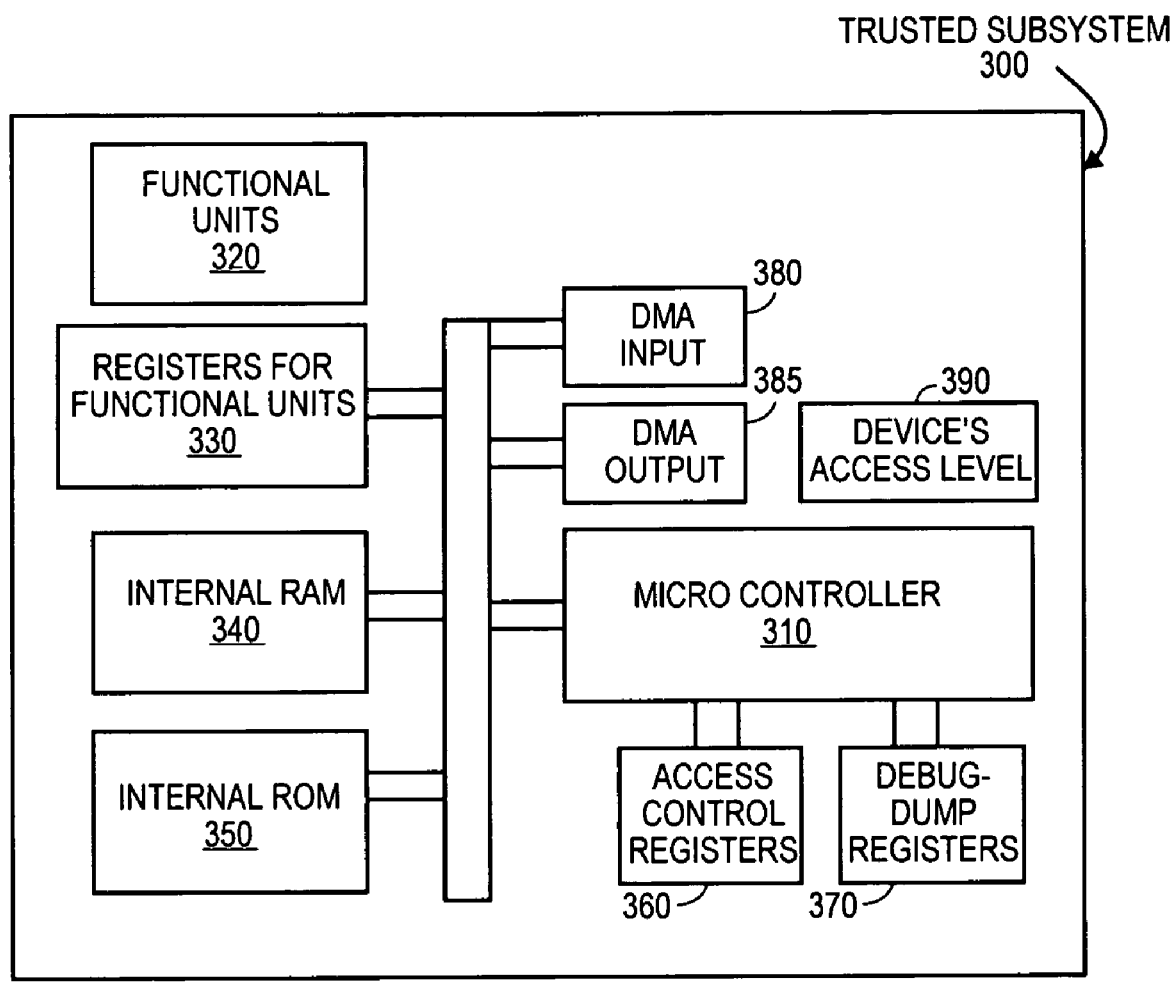
FIG. 3 shows a block diagram of a trusted subsystem that may contain a circuit similar to that of FIG. 2, according to an embodiment of the invention.

FIG. 3 shows a block diagram of a trusted subsystem that may contain a circuit similar to that of FIG. 2, according to an embodiment of the invention. In the illustrated embodiment, trusted subsystem 300 may comprise a micro controller 310, functional units 320, registers 330 for functional units, internal random access memory (RAM) 340, internal read-only memory (ROM) 350, access control registers 360, debug-dump registers 370, direct memory access (DMA) input 380, DMA output 385, and device access level control 390, although the scope of the invention is not limited in this respect. In one embodiment micro controller 310 may be specially designed to efficiently perform the operations that the trusted subsystem is intended to perform, but other embodiments may have other arrangements (e.g., micro controller 310 may have the same overall design as a general purpose CPU, etc.).

Functional units 320 may include circuitry to permit more efficient execution of certain operations. In one embodiment functional units 320 comprise circuitry to perform frequently used encryption/decryption algorithms, for example, Rivest-Shamir-Adleman (RSA), Secure Hash Algorithm (SHA), advanced encryption standard (AES), etc. Registers 330 may include temporary storage to be used by functional units 320 for input data, output data, intermediate results, etc. Internal ROM 350 may provide unchangeable instructions and/or data to be used by micro controller 310, while internal RAM 340 may be used as a scratchpad area and/or reusable area for data and/or instructions. DMA input 380 and DMA output 385 may be used to transfer data between devices external to trusted subsystem 300 and any or all of the internal units 330, 340, and possibly other areas as well. In one embodiment DMA input 380 and DMA output 385 are the only way to transfer data into or out of trusted subsystem 300, and in a particular embodiment micro controller 310 may fully control DMA input 380 and DMA output 385, thus preventing external devices from transferring unauthorized data into/out of trusted subsystem 300 and thereby compromising whatever security features have been designed into trusted subsystem 300, although the scope of the invention is not limited in this respect.

Access control registers 360 may be used to define what areas a given debug process is to be granted access to, while debug dump registers 370 may be used to specify the address of a debug dump routine that may transfer debug dump data out of trusted subsystem 300. In some embodiments, the debug dump registers 370 may contain actual debug dump data. In some embodiments, device access level control 390 may be used to define the level of access that an external device may have within trusted subsystem 300. In one embodiment with only a single defined level of access, device access level control 390 may define that level and access control registers 360 may be omitted. In another embodiment with multiple defined levels of access, access control registers 360 may define the various levels and device access level control 390 may be omitted. In still another embodiment, device access level control 390 may define the broadest level of access, while access control registers 360 may define more limited levels of access. Still other embodiments may use other arrangements.

Figure 4:
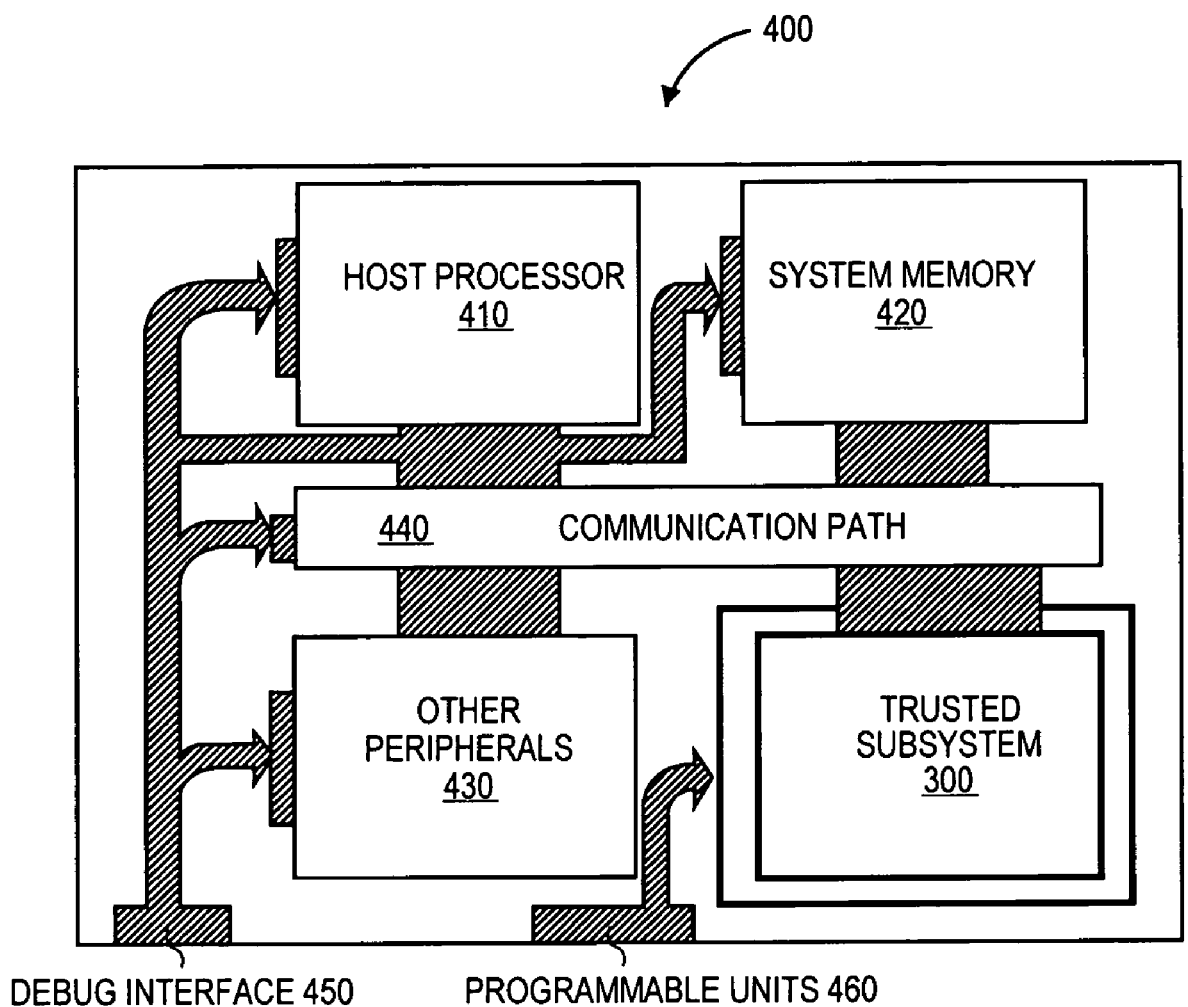
FIG. 4 shows a system containing a trusted subsystem, according to an embodiment of the invention.

FIG. 4 shows a system containing a trusted subsystem, according to an embodiment of the invention. In the illustrated embodiment, system 400 comprises host processor 410, system memory 420, trusted subsystem 300, other peripherals 430, a communications path 440, a debug interface 450, and programmable units 460, although the scope of the invention is not limited in this respect. In one embodiment, host processor 410 may be a general purpose processor for system 400, while system memory 420 may be the main memory for host processor 410. In one embodiment system memory 420 comprises volatile memory such as dynamic random access memory (DRAM), while in another embodiment system memory 420 comprises non-volatile memory such as flash memory, while in other embodiments system memory 420 may comprise a combination of volatile and non-volatile memory. Other peripherals 430 may comprise other devices and/or device controllers as needed for the specific operations of the system, such as, but not limited to, a disk controller, a graphics accelerator, a network interface, audio inputs/outputs, a display controller, a keyboard controller, etc.

Communications path 440 may provide a pathway for communications between host processor 410, system memory 420, trusted subsystem 300, and other peripherals 430. Communications path 400 may comprise various types of communications devices, such as but not limited to, a bus, multiple buses, a bridge, a direct connection, etc.

For external connections, debug interface 450 may provide an interface between an external debug system (not shown) and various internal parts of system 400, such as the host processor 410, system memory 420, other peripherals 430, and communications path 440. Programmable units 460 may provide an external way to program an indicator of what level of access is permitted during debug operations. In one embodiment programmable units 460 are set during manufacture and then sealed to prevent subsequent alteration. In another embodiment programmable units 460 are programmable after manufacture. In a particular embodiment programmable units 460 comprise fuses that may be blown, but other embodiments may use other techniques (e.g., non-volatile registers, etc.). Once programmed, the bits of programmable units 460 may be interpreted by circuitry (not shown) within trusted subsystem 300 to indicate what level of access is permitted by an external device connected to the debug interface 450.

Figure 5:
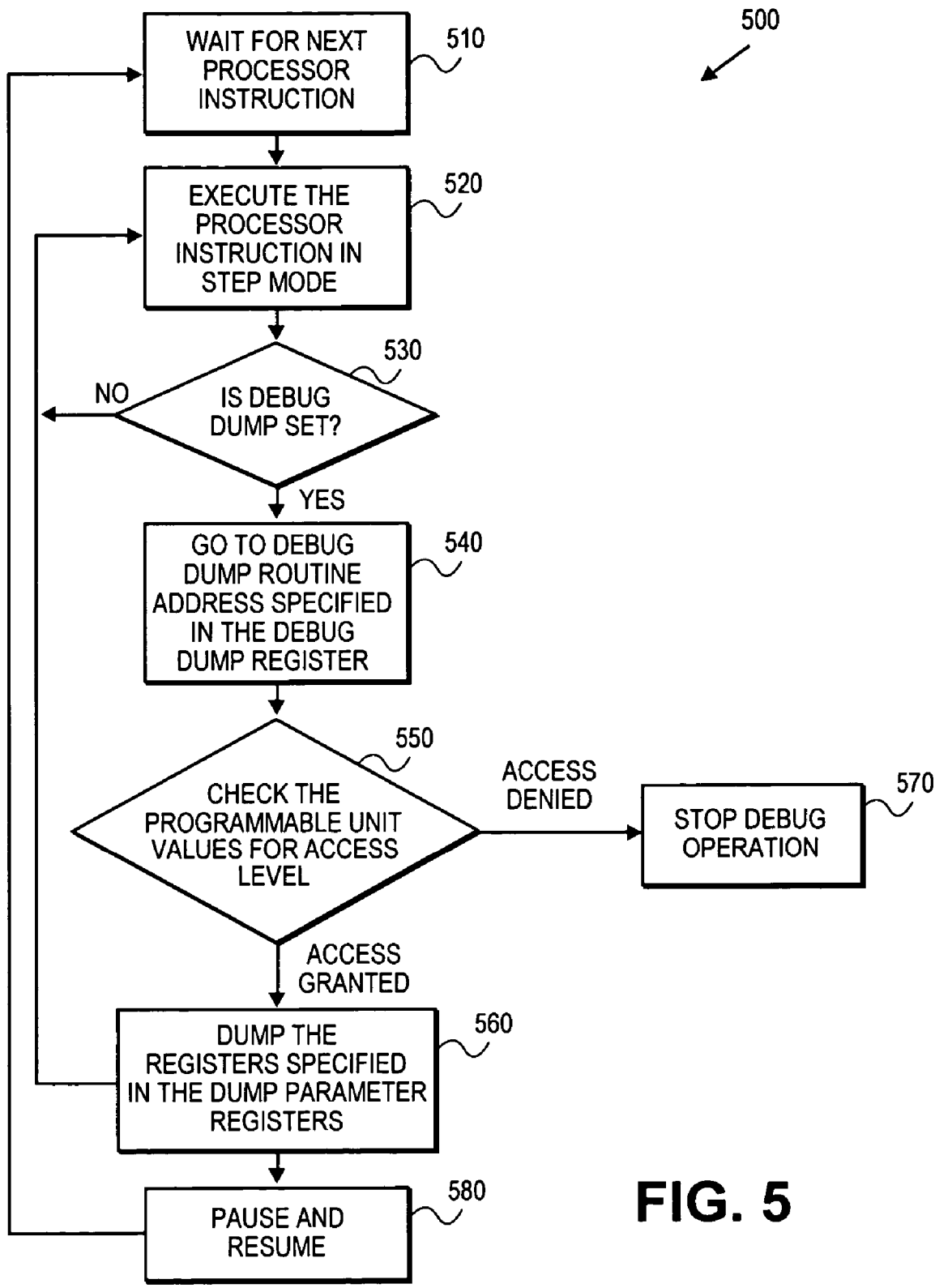
FIG. 5 shows a flow chart of a method of performing a debug operation, according to an embodiment of the invention.

FIG. 5 shows a flow chart of a method of performing a debug operation, according to an embodiment of the invention. The beginning of flow chart 500 assumes that a debug operation has already been set up, in which a debug device has been connected to the debug interface 450 (see FIG. 4) and system 400 has been set up to execute one instruction at a time, or to execute a predefined sequence of instructions, followed by a pause to dump the contents of a defined set of locations (e.g., registers, etc.) to the debug device through the debug interface. However, the scope of the invention is not limited in this respect.

Beginning at 510, there may be a pause while the next instruction is retrieved and/or placed into position for execution. At 520 the instruction may be executed in step mode. At decision block 530 it may be determined whether to stop and do a debug dump, or to execute another instruction in the sequence. If a debug dump indicator is not set, then processing returns to 520 to execute the next instruction in the sequence. If the debug dump indicator is set, indicating that the contents of the aforementioned locations are now to be dumped so that the affect of instruction execution may be examined, then processing may move to 540. At 540, execution may branch to a debug dump routine. The address of the debug dump routine may be contained in a specified one of the debug dump registers 370 (see FIG. 3).

At 550 the debug dump routine may check the programmable units to determine what level of access is permitted by the debug operation. In one embodiment this level may define restrictions on things such as what registers may be modified, what memory ranges may be accessed, what instructions may be executed, what resources may be accessed, the contents that may be placed in various registers or memory locations, etc., but other embodiments may include more, fewer, and/or different restrictions. If the execution violates these restrictions, which may indicate that the debug process has exceeded predefined security limitations, then the debug process may be interrupted or aborted at 570. In one embodiment, aborting the process may include any or all of, but is not restricted to, disabling the debug interface, locking out all access to the trusted subsystem, generating an error message through the host processor, etc.

If no violations are detected at 550, then the debug dump data may be transferred to the external debug device through the debug interface 450. In one embodiment the debug dump data may be contained in, and dumped from, some of the dump debug registers 370. In another embodiment the debug dump data may be dumped by transferring data from internal RAM 340 through the DMA output to communications path 440, and from there through the debug interface 450 (see FIGS. 3, 4). Other embodiments may use other techniques.

After dumping the debug data, at 580 the operation may pause and wait for further direction, or the operation may return to 510 to begin execution of another instruction or sequence of instructions.

Embodiments of the invention may be implemented in one or a combination of hardware, firmware, and software. Embodiments of the invention may also be implemented as instructions stored on or in a machine-readable medium, which may be read and executed by at least one processor to perform the operations described herein. A machine-readable medium may include any mechanism for storing or transmitting information in a form readable by a machine (e.g., a computer). For example, a machine-readable medium may include, but is not limited to, read only memory (ROM); random access memory (RAM); magnetic disk storage media; optical storage media; flash memory devices; electrical, optical, acoustical or other form of propagated signals (e.g., carrier waves, infrared signals, electrical digital signals, etc.), and others.

Figure 6:
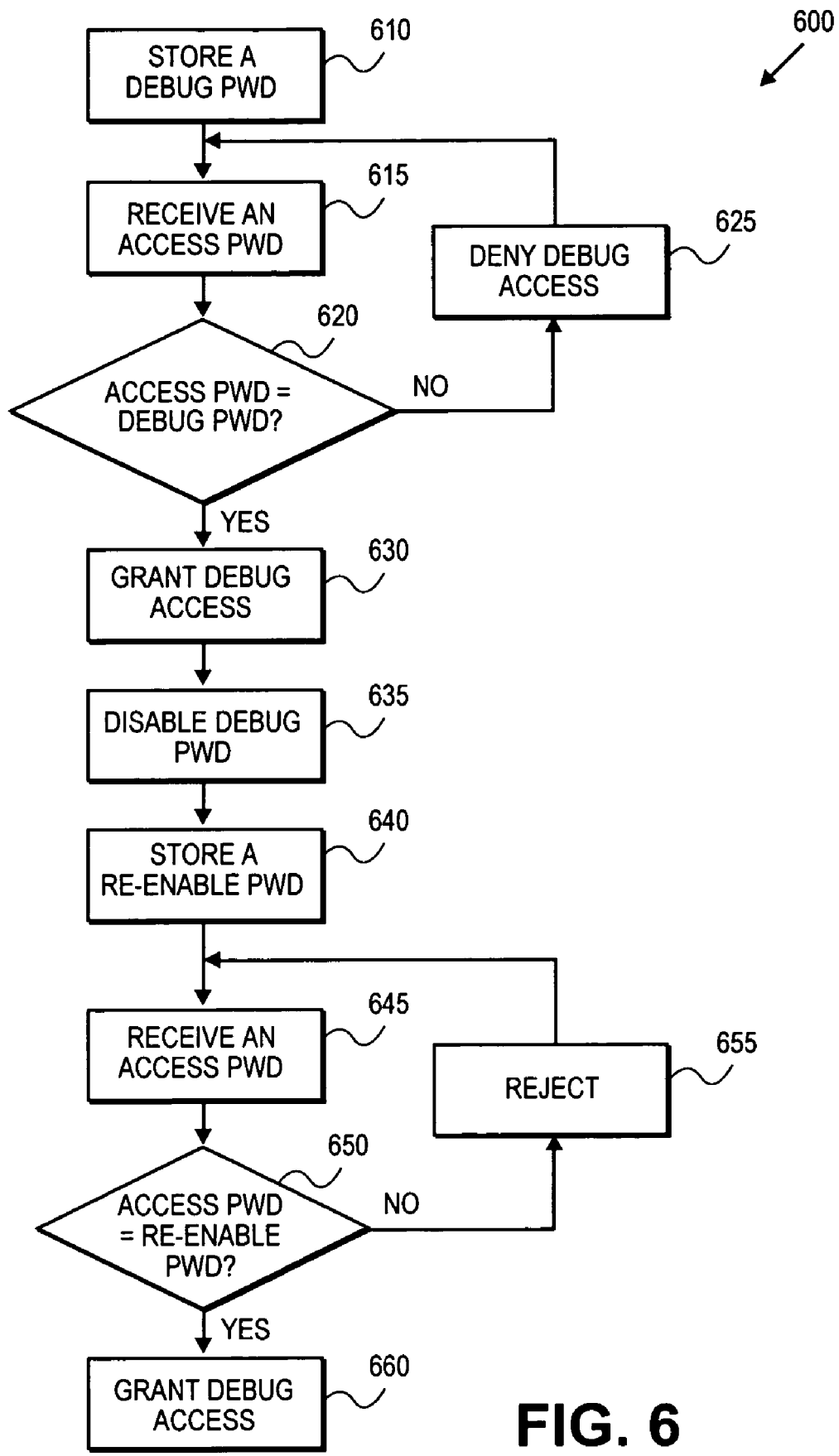
FIGS. 6 and 7 show flow charts of a method that may be implemented by executing instructions contained on or in a machine-readable medium, according to various embodiments of the invention.
Figure 7:
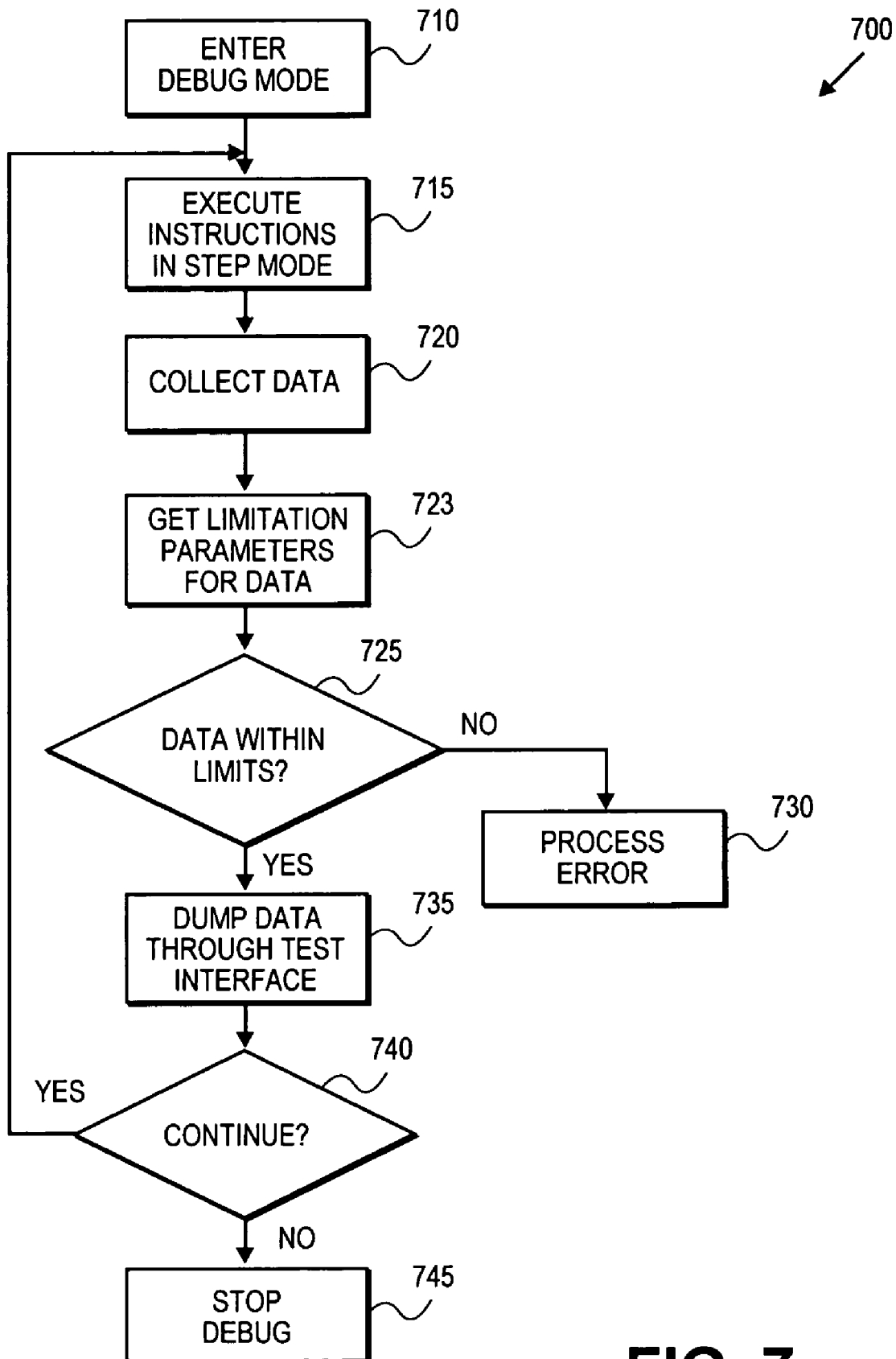

FIGS. 6 and 7 show flow charts of a method that may be implemented by executing instructions contained on or in a machine-readable medium, according to an embodiment of the invention. However, the scope of the invention is not limited in this respect.

In flow chart 600 of FIG. 6, at 610 a debug password may be stored, for subsequent use as a restriction on permitting debug access to a trusted subsystem. When a debug process is to begin, a user may request debug access by presenting an access password, which is received at 615. If the access password does not match the previously-stored debug password at 620, the request for debug access may be denied at 625. In some embodiments the system may then permit another password to be presented at 615 (as shown), but in other embodiments some form of error processing (not shown) may be executed (e.g., generating an error message, locking out debug access for a pre-determined time period, etc.). If the access password matches the previously-stored debug password, the request for debug access may be granted at 630. At this point, a debug operation may be performed, using code and processes not included in FIG. 6.

Once the user's debug operations have been completed, and the user is reasonably sure he or she will not need to use them further, the debug password may be disabled at 635. Although in one embodiment disabling may comprise erasing the password from its storage location, in other embodiments other techniques may be used (e.g., blocking read access to the storage location, writing over the storage location, etc.).

If further debug operations (e.g., by another entity) are contemplated, a re-enable password may be stored at 640. When another debug process is to begin, another user may request access through the debug interface by presenting an access password, which is received at 645. If the access password does not match the previously-stored re-enable password at 650, the request for debug access may be denied at 650. In some embodiments the system may then permit another password to be presented at 645 (as shown), but in other embodiments some form of error processing (not shown) may be executed (e.g., generating an error message, locking out debug access for a pre-determined time period, etc.). If the access password matches the previously-stored re-enable password, the request for debug access may be granted at 660. At this point, a debug operation may be performed, using code and processes not included in FIG. 6. In some embodiments the debug access granted at 620 and the debug access granted at 660 may grant access to different areas and resources.

In flow chart 700 of FIG. 7, at 710 a debug mode of operation may be entered, and operations may follow the remaining portions of FIG. 7, although the scope of the invention is not limited in this respect. In some embodiments, such entry may be controlled through the previously-described password process, or through another process not described, but other embodiments may not restrict access to debug operations in this manner. At 715, a sequence of one or more instructions may be executed in step mode, with execution pausing to collect data at 720. Such data may include, but is not limited to, the contents of various registers and/or memory locations, the addresses of various registers and/or memory locations, the states of various status bits, an identification of the instructions that were executed, etc.

At 723, parameters may be obtained that specify some limitations on the data collected at 720. Such parameters may be used to impose restrictions on the debug operation. Such restrictions may be used to limit debug operations to specified memory ranges, specified registers, specified types of instructions, etc. In one embodiment the parameters may be inferred from a previously-programmed set of bits, such as fuses, with intervening circuitry and/or code to convert the bits to the actual parameters, but other embodiments may use other techniques (e.g., directly reading the parameters from their programmed location, converting the bits to parameters through micro-code, etc.).

At 725, the collected data may be compared with the limitation parameters to determine if the data is within the indicated limits. Such limits may include, but are not limited to, a range of addresses within which the executed instructions may reside, a range of addresses of memory locations that may be written to, or read by, the executed instructions, the types of instructions that are permitted to be executed, other resources (e.g., registers, devices, etc.) that the executed code is permitted to access, etc. If the defined limits have been exceeded, the flow may move to 730 to process an error routine. Such an error routine may contain, but is not limited to, such things as presenting an error message, interrupting the debug process to gain other information, aborting the debug process, etc.

If the defined limits have not been exceeded, the flow may move to 735 to dump the relevant data through a debug interface. The data that may be dumped in this manner may be the same data whose limits were examined at 725, different data whose limits were not examined at 725, or a full or partial combination of both.

At 740 a decision may be made whether to stop the debug operation at 745, or to resume the debug operation by executing the next sequence of one or more instructions at 715. To collect a useful amount of debug data through the debug test interface, a number of such sequences may be executed in series before stopping the debug operation.

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. An apparatus, comprising:
a first circuitry to permit access, responsive to entering a first password, to a first set of resources to debug a first set of code in memory;
a storage structure to contain a second password;
a second circuitry coupled to the first circuitry and to the storage structure to permit access, responsive to entering the second password, to a second set of resources to debug a second set of code in the memory; wherein said first set of resources comprises a first portion of the memory and said second set of resources comprises a second portion of the memory different than the first portion; and
circuitry to prevent the access responsive to said entering the first password if the access responsive to said entering the second password is enabled, and to prevent the access responsive to said entering the second password if the access responsive to said entering the first password is enabled.

2. The apparatus of claim 1, wherein said access to the second set of resources is through a debug interface.

3. The apparatus of claim 2, adapted to place the second set of code in a substantially different portion of the memory than the first set of code.

4. The apparatus of claim 1, wherein the storage structure comprises a content addressable memory.

5. The apparatus of claim 1, wherein the storage structure comprises a programmable storage structure.

6. The apparatus of claim 1, wherein the second set of resources is substantially a subset of the first set of resources.

7. A system, comprising:
a volatile first memory;
a second memory coupled to the first memory to contain code for execution;
a processor coupled to the second memory to execute the code;
a first storage structure coupled to the processor to contain a first password;

a second storage structure coupled to the processor to contain a second password;

circuitry to permit access, responsive to entering the first password, to a first set of resources to debug a first set of code in the second memory, to disable said access to the first set of resources, and to enable access, responsive to entering the second password, to a second set of resources to debug a second set of code in the second memory; and wherein said first set of code comprises a first portion of the second memory and said second set of code comprises a second portion of the second memory different than the first portion.

8. The system of claim 7, wherein the first and second access are to be through a debug interface.

9. The system of claim 7, wherein the second storage structure is a content addressable memory.

10. The system of claim 7, wherein the circuitry is adapted to cause the access responsive to said entering the first password and the access responsive to said entering the second password to be mutually exclusive.

11. A method, comprising:
disabling a first password that enables performing a first set of code debug operations;
storing a second password;
entering the second password to enable performing a second set of code debug operations;
wherein being enabled to perform the first set of code debug operations and being enabled to perform the second set of code debug operations are mutually exclusive; and
wherein said first set of code comprises a first portion of memory and said second set of code comprises a second portion of memory different than the first portion.

12. The method of claim 11, wherein said being enabled to perform the second set of code debug operations comprises being enabled to perform a subset of the first code debug operations.

13. The method of claim 11, wherein said first and second code debug operations are performed through a debug interface.

14. The method of claim 11, wherein said disabling the first password results from said storing the second password.

15. The method of claim 11, further comprising enabling a third password that re-enables said performing the first set of code debug operations.

16. A machine-readable storage medium that provides instructions, which when executed by a computing platform, cause said computing platform to perform operations comprising:
receiving a first password to enable debug of a first set of code during a first debug stage;
disabling the first password to prevent further debugging activities during the first debug stage;
storing a second password;
receiving the second password to enable debug of a second set of code during a second debug stage;
wherein the operation of disabling the first password prevents access to the first set of code during the second debug stage; and
wherein said first set of code comprises a first portion of memory and said second set of code comprises a second portion of memory different than the first portion.

17. The medium of claim 16, wherein the operation of storing the second password results in said disabling the first password.

18. The medium of claim 16, wherein said operations further comprise using a third password to re-enable the debug of the first set of code.

* * * * *